United States Patent
Li et al.

(10) Patent No.: US 9,467,822 B2
(45) Date of Patent: Oct. 11, 2016

(54) METHOD FOR OBTAINING INTERFACE INFORMATION OF NEIGHBOR EVOLVED NODEB/RELAY NODE, AND WIRELESS RELAY SYSTEM

(75) Inventors: Dapeng Li, Shenzhen (CN); Lifeng Han, Shenzhen (CN); Zijiang Ma, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 179 days.

(21) Appl. No.: 13/813,991

(22) PCT Filed: Apr. 27, 2011

(86) PCT No.: PCT/CN2011/073369
§ 371 (c)(1),
(2), (4) Date: Feb. 4, 2013

(87) PCT Pub. No.: WO2012/019467
PCT Pub. Date: Feb. 16, 2012

(65) Prior Publication Data
US 2013/0142110 A1 Jun. 6, 2013

(30) Foreign Application Priority Data
Aug. 10, 2010 (CN) .......................... 2010 1 0252869

(51) Int. Cl.
*H04W 4/08* (2009.01)
*H04W 48/16* (2009.01)
(Continued)

(52) U.S. Cl.
CPC ............... *H04W 4/08* (2013.01); *H04B 7/155* (2013.01); *H04W 48/16* (2013.01); *H04W 8/26* (2013.01); *H04W 48/08* (2013.01); *H04W 84/047* (2013.01); *H04W 88/08* (2013.01)

(58) Field of Classification Search
CPC .......... H04B 7/155; H04B 7/15; H04B 7/14; H04W 8/26; H04W 48/08; H04W 4/08; H04W 84/047; H04W 88/08; H04W 48/16; H04W 92/20; H04W 92/045; H04W 24/02; H04W 36/0083; H04W 76/046; H04W 36/0055; H04W 88/04; H04L 43/18
See application file for complete search history.

(56) References Cited

U.S. PATENT DOCUMENTS

2009/0117897 A1* 5/2009 Israelsson et al. ............ 455/434
2010/0285802 A1* 11/2010 Ahluwalia et al. ........... 455/436
(Continued)

FOREIGN PATENT DOCUMENTS

| CN | 101651950 A | 2/2010 |
| CN | 101657028 A | 2/2010 |

(Continued)

OTHER PUBLICATIONS

International Search Report for corresponding application PCT/CN2011/073369 filed Apr. 27, 2011, Mail date Aug. 11, 2011.

*Primary Examiner* — Yee Lam
(74) *Attorney, Agent, or Firm* — Cantor Colburn LLP

(57) ABSTRACT

A method for obtaining interface information of a neighbor Evolved NodeB (eNB)/Relay Node (RN) is provided by the present invention. A Donor Evolved NodeB (DeNB) can establish a corresponding relationship between an eNB identifier of the neighbor eNB/RN network element and the GU Group Id List of the neighbor eNB/RN network element according to X2 interface information, and send the corresponding relationship to the RN network element/neighbor eNB; the DeNB can also send a GU Group Id List and cell information of the neighbor eNB/RN network element to the RN network element/neighbor eNB which can establish the corresponding relationship between the GU Group Id List and the eNB identifier of the neighbor eNB/RN network element. A wireless relay system is also provided by the present invention. The problem that the RN or the eNB network element in a wireless relay system can not obtain the corresponding relationship between the eNB identifier and the neighbor GU Group Id List, caused by the existence of an intermediate network element DeNB, is solved by the present invention.

20 Claims, 10 Drawing Sheets

(51) Int. Cl.
*H04W 8/26* (2009.01)
*H04W 48/08* (2009.01)
*H04W 84/04* (2009.01)
*H04W 88/08* (2009.01)
*H04B 7/155* (2006.01)

(56) References Cited

U.S. PATENT DOCUMENTS

| | | | |
|---|---|---|---|
| 2011/0028181 A1* | 2/2011 | Byun et al. | 455/525 |
| 2011/0237258 A1* | 9/2011 | Nylander et al. | 455/437 |
| 2011/0244851 A1* | 10/2011 | Gunnarsson et al. | 455/423 |
| 2011/0263282 A1* | 10/2011 | Rune et al. | 455/507 |
| 2011/0310791 A1* | 12/2011 | Prakash et al. | 370/315 |
| 2012/0039299 A1* | 2/2012 | Teyeb | H04B 7/2606 370/331 |
| 2012/0106370 A1* | 5/2012 | Radulescu | H04W 36/0083 370/252 |
| 2012/0142354 A1* | 6/2012 | Ahluwalia | 455/436 |
| 2012/0142356 A1* | 6/2012 | Serravalle et al. | 455/436 |
| 2013/0084870 A1* | 4/2013 | Nylander et al. | 455/436 |

FOREIGN PATENT DOCUMENTS

| | | |
|---|---|---|
| CN | 101730032 A | 6/2010 |
| CN | 101754308 A | 6/2010 |

* cited by examiner

METHOD FOR OBTAINING INTERFACE INFORMATION OF NEIGHBOR EVOLVED NODEB/RELAY NODE, AND WIRELESS RELAY SYSTEM

FIELD OF THE INVENTION

The present invention relates to the wireless communication field, and in particular to a method for obtaining interface information of a neighbor evolved NodeB (eNB)/Relay Node (RN), and a wireless relay system.

BACKGROUND OF THE INVENTION

FIG. 1 is a schematic view of the structure of a cellular wireless communication system. As shown in FIG. 1, the cellular wireless communication system mainly consists of terminals, an access network and a core network. The network, consisting of eNBs or eNBs and base station controllers, is called a Radio Access Network (RAN). The RAN is responsible for access stratum transactions, such as radio resource management. Physical or logical connection could exist between eNBs based on the actual situation, such as between eNB 1 and eNB 2 or between eNB 1 and eNB 3 as shown in FIG. 1. Each eNB could be connected with one or more core network (CN) nodes. The CN, responsible for non-access stratum (NAS) transactions like location update, is also an anchor point of user plane. User Equipment (UE) refers to various types of equipment that could have communication with the cellular wireless communication system, such as mobile phones or laptops.

In the cellular wireless communication system, the wireless coverage of a fixed eNB network is restricted for all sorts of reasons, such as inevitable coverage holes in radio network due to the obstruction of building structures to radio signals. On the other hand, in cell-edge areas, due to the attenuation of radio signals and interference from the neighbor cells, the communication quality of a UE in the cell-edge areas is poor and the error rate of wireless transmission rises. To raise the coverage of data rate, group mobility, temporary network deployment, throughput in the cell-edge areas and coverage in a new region, a solution is to introduce a radio network node in the cellular wireless communication system. The introduced node is called Relay.

In Relay, there is a kind of station having the function of relaying data and probable control information among other network nodes through a radio link, and this station is also called Relay Node/Relay Station. FIG. 2 is a schematic view of relay network architecture. As shown in FIG. 2, the UE directly served by eNB is called Macro UE, and the UE served by a Relay is called Relay UE. A Direct link is the radio link between an eNB and a UE, comprising downlink/uplink (DL/UL) direct link; an access link is the radio link between a Relay and a UE, comprising DL/UL access link; and a backhaul link is the radio link between an eNB and a Relay, comprising DL/UL relay link.

Relays could relay data through several methods, such as directly amplifying radio signals received from eNBs, or correspondingly processing the data received from eNBs and then forwarding the correctly received packages to UEs, or eNBs cooperating with Relays to send data to UEs. Relays could also relay data from UEs to eNBs.

Among many Relay types, a kind Relay, called Type I relay, has characteristics as follows.

A UE can not distinguish a Relay from a cell under a fixed eNB, namely, from the point of view of a UE, the Relay itself is just a cell and has no difference from a cell under an eNB, and this kind of cell is called a Relay cell. The relay cell has its own physical cell identity (PCI), and broadcasts just like a common cell. When a UE resides in the Relay cell, the Relay cell could separately distribute and dispatch radio resources for the UE, independent from the radio resource dispatching of an eNB participating in relay. The eNB participating in relay is also called Donor eNB, which is the eNB connected to a Relay by a backhaul link. The interface and the protocol stack between a Relay cell and a Relay UE are the same as that between a common eNB cell and a UE.

Type I Relay is called Relay Node (RN). The eNB responsible for Type I Relay access is called Donor-eNB (DeNB). The air interface between RN and Relay UE is called Uu interface. The air interface between RN and DeNB is called Un interface, wherein, on the Uu interface, all wireless access layer control plane and user plane protocols terminate in RN; on the Un interface, at least the protocol layers of Wireless Media Access Control Protocol (MAC), Radio Link Control Protocol (RLC) and a protocol for header compression and decompression (Packet Data Convergence Protocol, PDCP) are included.

An LTE system adopts an Internet Protocol (IP)-based flat network. FIG. 3 is a schematic view of LTE network architecture. As shown in FIG. 3, the LTE network consists of an Evolved Universal Terrestrial Radio Access Network (E-UTRAN) and CN nodes, wherein a CN node comprises a Mobility Management Entity (MME), a Serving Gateway (S-GW) and other support nodes. The MME is responsible for control plane works, such as mobility management, processing of NAS signaling, and management of mobility management context of a user. The S-GW is responsible for the transmission, forwarding and route switching of UE user plane data. The eNBs are logically connected with each other though X2 interfaces, adopted to support the mobility of UE in the whole network and to guarantee users' seamless handover. Each eNB is connected to the core network through an S1 interface and System Architecture Evolution (SAE), which means that the eNB is connected with an MME through an S1-MME interface of a control plane, and is connected with an S-GW through an S1-U interface of a user plane, wherein the S1 interface supports multipoint connection between eNB and MME/S-GW.

FIG. 4 is a schematic view of a protocol stack of an X2-control plane interface. As shown in FIG. 4, the network layer thereof adopts the IP protocol, the transport layer above the network layer adopts the SCTP protocol, and the application layer on the top (namely the control plane) adopts the S1-AP protocol, the transmission carrier at the bottom layer is adopted for sending the S1-AP signaling. FIG. 5 is a schematic view of a protocol stack of an S1-user plane interface. As shown in FIG. 5, in the protocol stack of the S1-U interface, GTP-U/UDP/IP forms a transmission carrier which is adopted to send user plane Protocol Data Unit (PDU) between the eNB and the S-GW. The transmission carrier is identified by TEID of GTP-U and IP address, comprising: GTP-U TEID (Tunnel Endpoint Identifier) at source side, GTP-U TEID at target side, IP address at source side and IP address at target side, wherein the UDP port number is fixed to be 2152, and GTP-U is a tunneling protocol adopted to achieve seamless transmission on IPv4 and IPv6. Each transmission carrier is adopted to carry the service data flows of one service.

Each eNB performs signaling and data transmission with a UE through the Uu interface (initially defined as a wireless interface between the UTRAN and the UE). FIG. 6 and FIG.

7 show the air interface protocol stack between eNB and L1, L2 and L3 of UE from control plane and user plane respectively.

Before the network element of RN is introduced, there has been clear definition of X2 interface by LTE-A system in the prior art: the X2-AP protocol terminates at the RN. FIG. 8 is a protocol stack of the X2 interface of a control plane supporting RN. As shown in FIG. 8, there is only one X2 interface link between a RN and a DeNB, and there is only one X2 interface link between a DeNB and other eNB with an X2 interface relationship. The DeNB processes and forwards all the UE-dedicated processes between an RN and other eNBs. Non-UE-dedicated processes are only processed between RNs and DeNBs or between DeNBs and other eNBs.

FIG. 9 is a schematic view of typical network architecture after the introduction of an RN network element. As shown in FIG. 9, RN equipment is connected to the DeNB, and X2 interface links exist between DeNB and RN and between DeNB and eNB. After the UE accesses the RN equipment, the UE could switch to other network elements, for example, it could switch to DeNB, eNB through S1 interface or X2 interface respectively.

Between RN and the eNB network element there might be a situation of neighbor cells existed, a UE on the RN could switch to the eNB. This requires that the RN needs to obtain necessary information of the eNB so as to support the realization of a switch function between the RN and the eNB, wherein the information comprises GU Group Id List information, which indicates a pool of the core network that the eNB belongs to, and is adopted for the network element to judge whether the switching type is S1 switching or X2 switching. If the network element finds that the pool of the core network it belongs to is different from that in the target side, the network element has to choose the S1 switching; moreover, if the network element does not have this information, the network element has to choose the S1 switching.

The corresponding relationship, established on the network element, between the eNB identifier (eNB id) and the GU Group Id List of the pool of the core network thereof is a necessary support for judging the switching function. But in the system with the introduction of the RN, such corresponding relationship could not be established through the existing technology yet, especially between the RN network element and the eNB network element.

In the public known technologies, the sending of X2 interface information between an RN and an eNB could be performed by the following methods.

Consider the sending of interface information of the eNB to the RN. If there exists an X2 interface in the eNB and the DeNB, the eNB could adopt an eNB configuration update process or an X2 setup process of the X2 interface protocol to send the network element information to the DeNB through the X2 interface between the eNB and the DeNB, wherein the eNB network element information is sent as a serving cell of the eNB to DeNB. The DeNB could adopt an eNB configuration update process or an X2 setup process of the X2 interface protocol to send the eNB network element information to the RN through the X2 interface between the DeNB and the RN, wherein the eNB network element information is sent as a serving cell of the DeNB to the RN.

On the other hand, consider how RN interface information is sent to the eNB. The RN could adopt an eNB configuration update process or an X2 setup process of the X2 interface protocol to send the RN network element information to the DeNB through the X2 interface between the RN and the DeNB, wherein the RN network element information is sent as a serving cell of the RN to the DeNB. If there exists an X2 interface in the eNB and the DeNB, the DeNB could adopt an eNB configuration update process or an X2 setup process of the X2 interface protocol to send the RN network element information to the eNB through the X2 interface between the DeNB and the eNB, wherein the RN network element information is sent as a serving cell of the DeNB to the DeNB.

However, during the process above, for example, when the DeNB forwards the eNB network element information to the RN, if the eNB is just treated as the serving cell of the DeNB to be sent to the RN, the DeNB could only send the serving cell information sent by the eNB to the RN, but the GU group Id list of the eNB could not be added in the GU group Id list of the DeNB for sending, thus the RN would get a wrong corresponding relationship between the eNB id and the GU Group Id List, therefore the fundamental functions, such as judgment on a switching type, can not be fulfilled.

SUMMARY OF THE INVENTION

In view of the above, the present invention provides a method for obtaining interface information of a neighbor evolved NodeB (eNB)/Relay Node (RN) and a wireless relay system, which can enable an RN to get a correct corresponding relationship between the eNB id and the GU Group Id List, so as to guarantee the fulfillment of fundamental functions such as judgment on a switching type.

The technical solution of the present invention is realized as follows.

A method for obtaining interface information of a neighbor eNB/RN, comprising:

a DeNB establishing a corresponding relationship between an eNB identifier of a neighbor eNB/RN network element and a GU Group Id List of the neighbor eNB/RN network element, and sending the corresponding relationship to the RN network element/neighbor eNB; or a DeNB sending a GU Group Id List and cell information of a neighbor eNB/RN network element to the RN network element/neighbor eNB, and the RN network element/neighbor eNB establishing a corresponding relationship between an eNB identifier of the neighbor eNB/RN network element and the GU Group Id List of the neighbor eNB/RN network element.

When an X2 interface link between the DeNB and the RN network element/neighbor eNB is not established, the step of the DeNB sending the corresponding relationship between the eNB identifier of the neighbor eNB/RN network element and the GU Group Id List of the neighbor eNB/RN network element to the RN network element/neighbor eNB comprises: the DeNB sending an X2 setup request message or an X2 setup response message, which carries the corresponding relationship between the eNB identifier of the neighbor eNB/RN network element and the GU Group Id List of the neighbor eNB/RN network element, to the RN network element/neighbor eNB.

When an X2 interface link between the DeNB and the RN network element/neighbor eNB has been established, the step of the DeNB sending the corresponding relationship between the eNB identifier of the neighbor eNB/RN network element and the GU Group Id List of the neighbor eNB/RN network element to the RN network element/neighbor eNB comprises: the DeNB sending an eNB configuration update message, which carries the corresponding relationship between the eNB identifier of the neighbor eNB/RN network element and the GU Group Id List of the neighbor eNB/RN network element, to the RN network element/neighbor eNB.

The steps of the DeNB sending the GU Group Id List and the cell information of the neighbor eNB/RN network element to the RN network element/neighbor eNB, and the RN network element/neighbor eNB establishing the corresponding relationship between the eNB identifier of the neighbor eNB/RN network element and the GU Group Id List of the neighbor eNB/RN network element comprise:

the DeNB sending the GU Group Id List and the cell information of the neighbor eNB/RN network element to the RN network element/neighbor eNB through an eNB configuration update message, wherein the eNB configuration update message only carries relevant information of the neighbor eNB/RN network element; and the RN network element/neighbor eNB parsing the eNB configuration update message to obtain the GU Group Id List and the eNB identifier of the neighbor eNB/RN network element, and establishing the corresponding relationship between the GU Group Id List and the eNB identifier of the neighbor eNB/RN network element.

Before the step of the DeNB establishing the corresponding relationship between the eNB identifier of the neighbor eNB/RN network element and the GU Group Id List of the neighbor eNB/RN network element, or before the step of the DeNB sending the GU Group Id List and the cell information of the neighbor eNB/RN network element to the RN network element/neighbor eNB, the method further comprises: the DeNB obtaining X2 interface information of the neighbor eNB/RN network element, wherein the X2 interface information comprises the eNB identifier, the cell information and the GU Group Id List of the neighbor eNB/RN network element, the cell information of the neighbor eNB/RN network element refers to information of all cells, or information of part of cells, or information of cells to be added, or information of cells to be deleted of the neighbor eNB/RN network element;

the GU Group Id List of the neighbor eNB/RN network element correspondingly refers to the whole GU Group Id List, or part of the GU Group Id List, or the GU Group Id List to be added, or the GU Group Id List to be deleted of the neighbor eNB/RN network element.

The step of the DeNB obtaining the X2 interface information of the neighbor eNB/RN network element comprises: the DeNB obtaining the X2 interface information of the neighbor eNB/RN network element in a manner of active obtaining, passive receiving or network management configuration.

A wireless relay system, comprising: a DeNB, a neighbor eNB and an RN, wherein the DeNB is configured to establish a corresponding relationship between an eNB identifier of the neighbor eNB/RN network element and a GU Group Id List of the neighbor eNB/RN network element, and send the corresponding relationship to the RN network element/ neighbor eNB.

The DeNB is configured to send the corresponding relationship to the RN network element/neighbor eNB in the following manners: when an X2 interface link between the DeNB and the RN network element/neighbor eNB is not established, an X2 setup request message or an X2 setup response message sent to the RN network element/neighbor eNB carries the corresponding relationship between the eNB identifier of the neighbor eNB/RN network element and the GU Group Id List of the neighbor eNB/RN network element; when an X2 interface link between the DeNB and the RN network element/neighbor eNB has been established, an eNB configuration update message sent to the RN network element/neighbor eNB carries the corresponding relationship between the eNB identifier of the neighbor eNB/RN network element and the GU Group Id List of the neighbor eNB/RN network element.

The DeNB is further configured to obtain X2 interface information of the neighbor eNB/RN network element, wherein the X2 interface information comprises the eNB identifier, the cell information and the GU Group Id List of the neighbor eNB/RN network element;

the cell information of the neighbor eNB/RN network element refers to information of all cells, or information of part of cells, or information of cells to be added, or information of cells to be deleted of the neighbor eNB/RN network element;

the GU Group Id List of the neighbor eNB/RN network element correspondingly refers to the whole GU Group Id List, or part of the GU Group Id List, or the GU Group Id List to be added, or the GU Group Id List to be deleted of the neighbor eNB/RN network element.

A wireless relay system, comprising: a DeNB, a neighbor eNB and an RN, wherein the DeNB is configured to send a GU Group Id List and cell information of a neighbor eNB/RN network element to the RN network element/neighbor eNB; and the RN network element/neighbor eNB is configured to establish a corresponding relationship between an eNB identifier of the neighbor eNB/RN network element and the GU Group Id List of the neighbor eNB/RN network element, according to the cell information and the GU Group Id List sent from the DeNB.

The DeNB is configured to send the GU Group Id List and the cell information of the neighbor eNB/RN network element to the RN network element/neighbor eNB in the following manner: the DeNB sending the GU Group Id List and the cell information of the neighbor eNB/RN network element to the RN network element/neighbor eNB through an eNB configuration update message, wherein the eNB configuration update message only carries relevant information of the neighbor eNB/RN network element; and the RN network element/neighbor eNB is configured to establish the corresponding relationship between the eNB identifier of the neighbor eNB/RN network element and the GU Group Id List of the neighbor eNB/RN network element in the following manner: the RN network element/neighbor eNB parsing the eNB configuration update message to obtain the GU Group Id List and the eNB identifier of the neighbor eNB/RN network element, and establishing the corresponding relationship between the GU Group Id List and the eNB identifier of the neighbor eNB/RN network element.

The DeNB is further configured to obtain X2 interface information of the neighbor eNB/RN network element, wherein the X2 interface information comprises the eNB identifier, the cell information and the GU Group Id List of the neighbor eNB/RN network element;

the cell information of the neighbor eNB/RN network element refers to information of all cells, or information of part of cells, or information of cells to be added, or information of cells to be deleted of the neighbor eNB/RN network element;

the GU Group Id List of the neighbor eNB/RN network element correspondingly refers to the whole GU Group Id List, or part of the GU Group Id List, or the GU Group Id List to be added, or the GU Group Id List to be deleted of the neighbor eNB/RN network element.

Through the method for obtaining interface information of a neighbor eNB/RN and a wireless relay system provided by the present invention, a DeNB can establish a corresponding relationship between an eNB identifier of the neighbor eNB/RN network element and the GU Group Id List of the neighbor eNB/RN network element according to X2 interface information, and send the corresponding relationship to the RN network element/neighbor eNB; the DeNB can also send a GU Group Id List and cell information of the neighbor eNB/RN network element to the RN network element/neighbor eNB which can establish the corresponding relationship between the GU Group Id List and the eNB identifier of the neighbor eNB/RN network element. The problem that the RN or the eNB network element in a wireless relay system can not obtain the corresponding relationship between the eNB id and the GU Group Id List thereof, caused by the existence of an intermediate network element DeNB, is solved by the present invention.

DETAILED DESCRIPTION OF THE EMBODIMENTS

Figure 1:
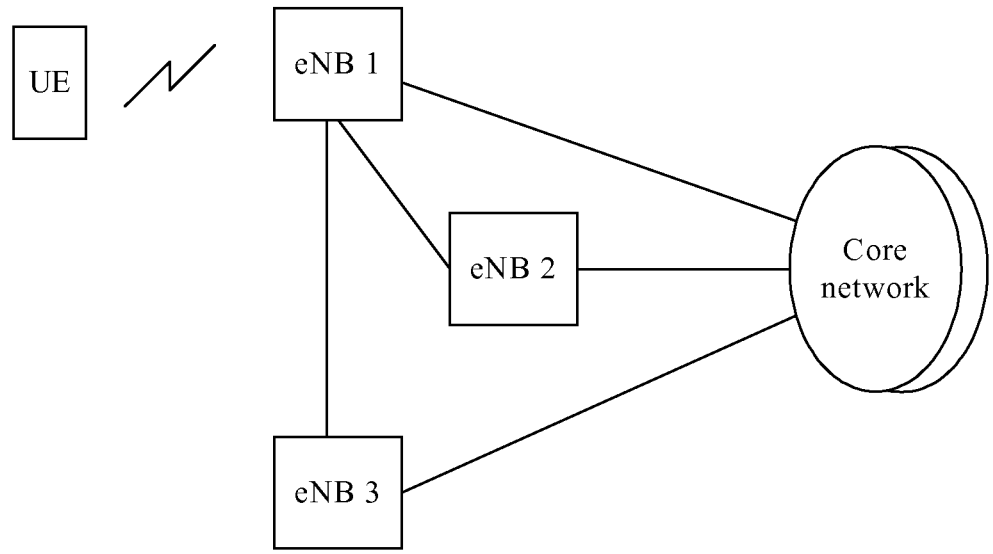
FIG. 1 is a schematic view of a structure of a cellular wireless communication system.
Figure 2:
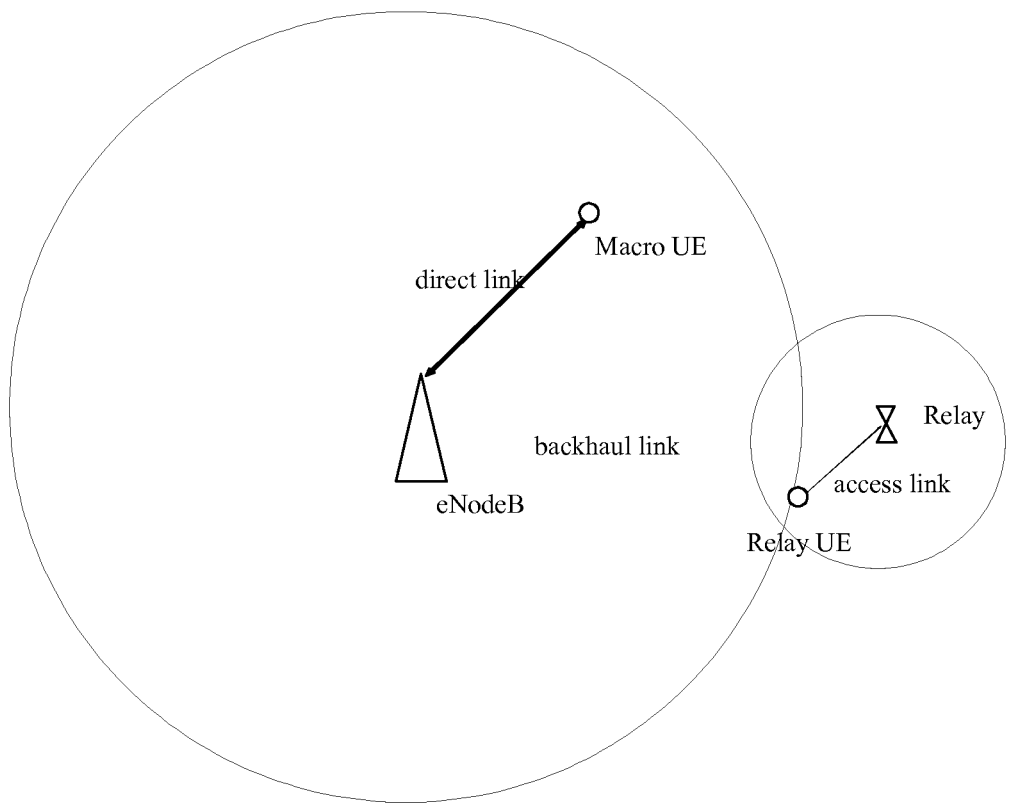
FIG. 2 is a schematic view of relay network architecture.
Figure 3:
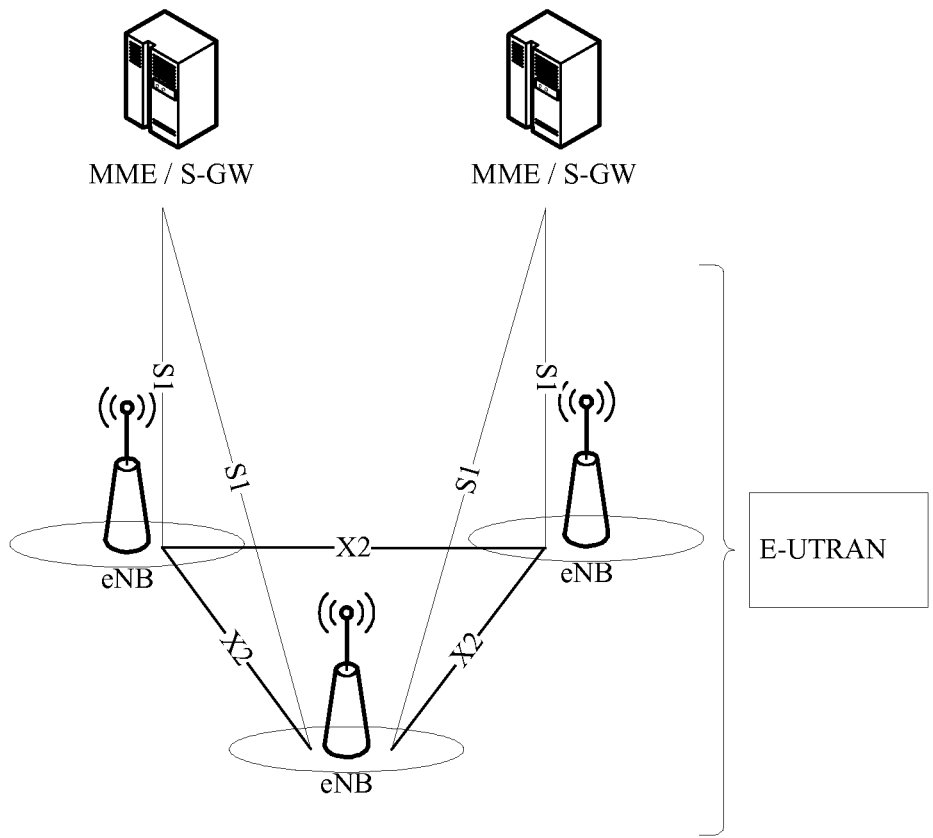
FIG. 3 is a schematic view of LTE network architecture.
Figure 4:
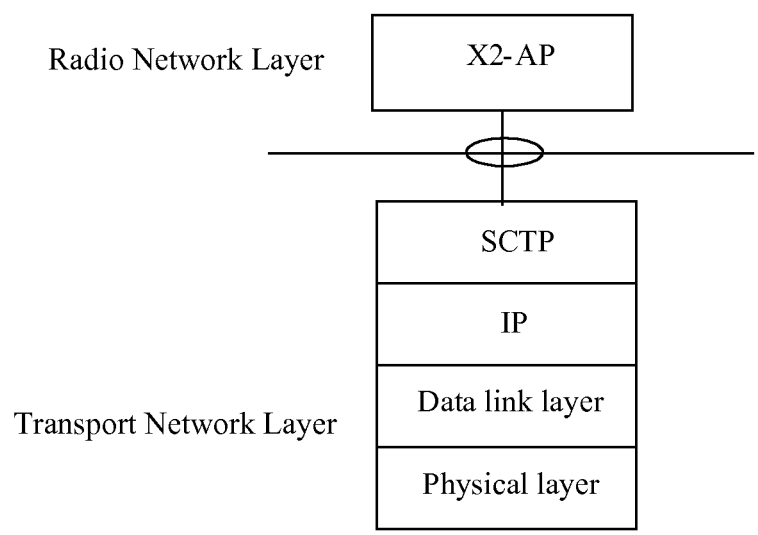
FIG. 4 is a schematic view of a protocol stack of an X2-control plane interface.
Figure 5:
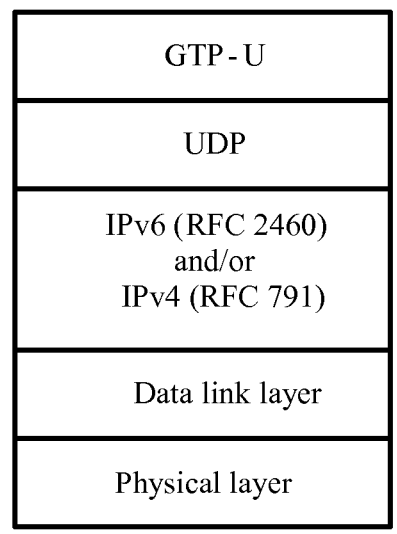
FIG. 5 is a schematic view of a protocol stack of an S1-user plane interface.
Figure 6:
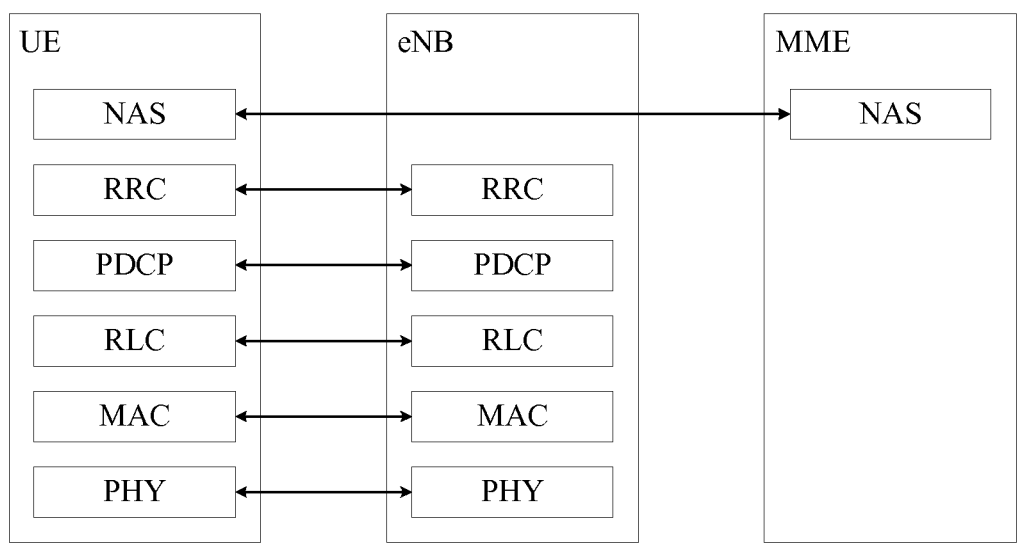
FIG. 6 is a schematic view of an air interface protocol stack (control plane) between an eNB and L1, L2 and L3 of a UE.
Figure 7:
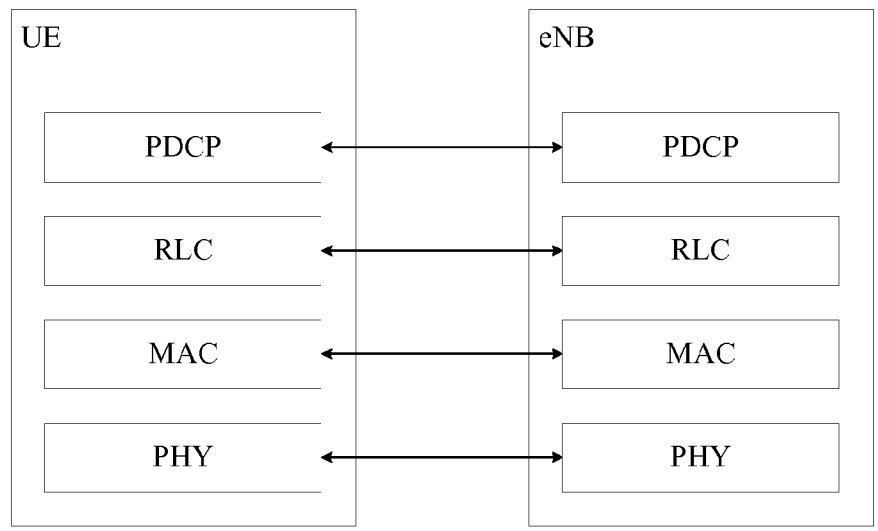
FIG. 7 is a schematic view of an air interface protocol stack (user plane) between an eNB and L1, L2 and L3 of a UE.
Figure 8:
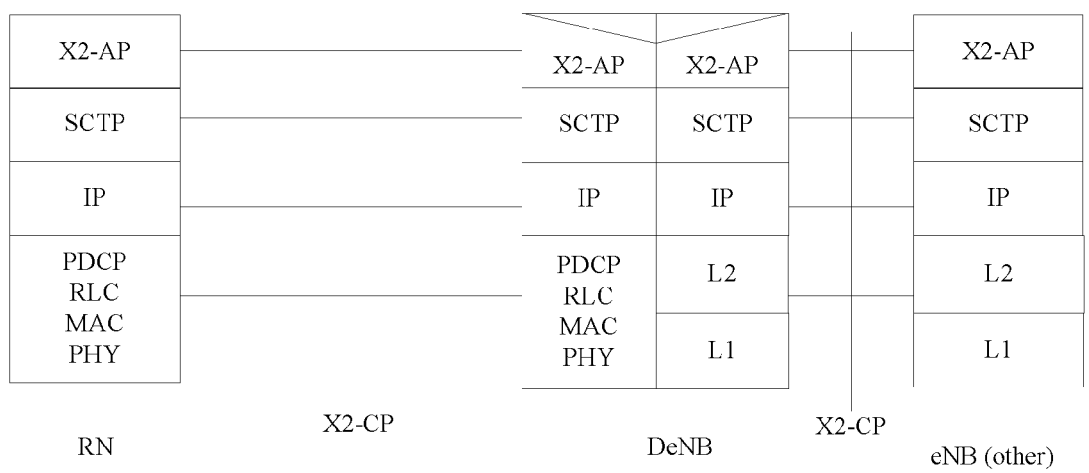
FIG. 8 is a protocol stack of the control plane X2 interface supporting RN.

The basic idea of the embodiments of the present invention is: a DeNB can establish a corresponding relationship between an eNB identifier of the neighbor eNB/RN network element and the GU Group Id List of the neighbor eNB/RN network element according to X2 interface information, and send the corresponding relationship to the RN network element/neighbor eNB; the DeNB can also send a GU Group Id List and cell information of the neighbor eNB/RN network element to the RN network element/neighbor eNB which can establish the corresponding relationship between the GU Group Id List and the eNB identifier of the neighbor eNB/RN network element.

In the embodiments of the present invention, the DeNB obtains the X2 interface information of a neighbor eNB/RN network element, wherein the X2 interface information comprises the eNB identifier (Global eNB ID), serving cell and GU Group Id List of the neighbor eNB/RN network element. Herein the serving cell is the cell information. The DeNB can obtain the X2 interface information of the neighbor eNB/RN network element through many methods, such as active obtaining, passive receiving and network management configuration.

Afterwards, the DeNB can establish a corresponding relationship between the eNB identifier of the neighbor eNB/RN network element and the GU Group Id List of the neighbor eNB/RN network element according to the X2 interface information, and send the corresponding relationship to the RN network element/neighbor eNB. The DeNB can also send the GU Group Id List and the cell information of the neighbor eNB/RN network element to the RN network element/neighbor eNB which can establish the corresponding relationship between the eNB identifier of the neighbor eNB/RN network element and the GU Group Id List of the neighbor eNB/RN network element.

On the basis that the DeNB obtains the X2 interface information of the neighbor eNB/RN network element, there might be many situations in the embodiment of the present invention as below.

1) An X2 interface link is not established between the DeNB and the RN network element/neighbor eNB.

Herein, if the above method that the DeNB establishes the corresponding relationship between the eNB identifier of the neighbor eNB/RN network element and the GU Group Id List of the neighbor eNB/RN network element is adopted, then depending on different initiators of the X2 interface link between the DeNB and the RN network element/neighbor eNB, the DeNB can make an X2 setup request message (the DeNB is the initiator) or an X2 setup response message (the RN network element/neighbor eNB is the initiator) carry the corresponding relationship between the eNB identifier of the neighbor eNB/RN network element and the GU Group Id List of the neighbor eNB/RN network element.

If the above method that the RN network element/neighbor eNB establishes the corresponding relationship between the eNB identifier of the neighbor eNB/RN network element and the GU Group Id List of the neighbor eNB/RN network element is adopted, after the X2 interface link between the DeNB and the RN network element/neighbor eNB is established according to the prior art, it is classified as the condition that the X2 interface link between the DeNB and the RN network element/neighbor eNB has been established.

2) An X2 interface link between the DeNB and the RN network element/neighbor eNB has been established.

Herein, if the method that the DeNB establishes the corresponding relationship between the eNB identifier of the neighbor eNB/RN network element and the GU Group Id List of the neighbor eNB/RN network element is adopted, then the DeNB can make an eNB configuration update message carry the corresponding relationship between the eNB identifier of the neighbor eNB/RN network element and the GU Group Id List of the neighbor eNB/RN network element.

If the method that the RN network element/neighbor eNB establishes the corresponding relationship between the eNB identifier of the neighbor eNB/RN network element and the GU Group Id List of the neighbor eNB/RN network element is adopted, then the DeNB can send the cell information (information of all the cells, or information of part of the cells, information of the cells to be added, or information of the cells to be deleted) and the GU Group Id List (the whole GU Group Id List, or part of the GU Group Id List, or GU Group Id List to be added, or GU Group Id List to be deleted) of the neighbor eNB/RN network element to the RN network element/neighbor eNB through the eNB configuration update message, the RN network element/neighbor eNB parses the eNB configuration update message to obtain the eNB identifier and the GU Group Id List of the neighbor eNB/RN network element and establishes the corresponding relationship between the eNB identifier and the GU Group Id List of the neighbor eNB/RN network element. What requires explanation is: no matter the DeNB sends part of or all of the cells, these cells should be sent to the receiver together with their information of the pool of the core network.

What requires explanation is: when the DeNB sends the eNB configuration update message, this message shall only carry the relevant information of the neighbor eNB/RN network element, so the DeNB must guarantee that the information about the DeNB itself or other network elements could not be carried at the same time.

What requires explanation is: when an X2 interface between the DeNB and the neighbor eNB/RN network element has been established while an X2 interface between the DeNB and the RN network element/neighbor eNB has not been established yet, in the process of establishing an X2 link between the DeNB and the RN network element/neighbor eNB, if the DeNB finds that there is a need to send the X2 interface information of the neighbor eNB/RN network element to the RN network element/neighbor eNB, then the X2 link between the DeNB and the RN network element/neighbor eNB should be established first, and then processing is performed according to the condition that an X2 interface link between the DeNB and the RN network element/neighbor eNB has been established.

What requires explanation is: the embodiment of the present invention does not specify that the corresponding relationship between the eNB identifier of the neighbor eNB/RN network element and the GU Group Id List of the neighbor eNB/RN network element must be carried only by existing messages; the corresponding relationship can also be carried by newly-defined messages.

What requires explanation is: the neighbor eNB in the embodiment of the present invention generally refers to the one that neighbors the DeNB and the RN at the same time.

The embodiment of the present invention also puts forward a wireless relay system, comprising a DeNB, a neighbor eNB and an RN, wherein the DeNB is configured to establish a corresponding relationship between an eNB identifier of the neighbor eNB/RN network element and a GU Group Id List of the neighbor eNB/RN network element, and send the corresponding relationship to the RN network element/neighbor eNB.

The DeNB is configured to send the corresponding relationship to the RN network element/neighbor eNB in the following manners: when an X2 interface link between the DeNB and the RN network element/neighbor eNB is not established, an X2 setup request message or an X2 setup response message sent to the RN network element/neighbor eNB carries the corresponding relationship between the eNB identifier of the neighbor eNB/RN network element and the GU Group Id List of the neighbor eNB/RN network element; when an X2 interface link between the DeNB and the RN network element/neighbor eNB has been established, an eNB configuration update message sent to the RN network element/neighbor eNB carries the corresponding relationship between the eNB identifier of the neighbor eNB/RN network element and the GU Group Id List of the neighbor eNB/RN network element.

The DeNB is further configured to obtain X2 interface information of the neighbor eNB/RN network element, wherein the X2 interface information comprises the eNB identifier, the cell information and the GU Group Id List of the neighbor eNB/RN network element;

the cell information of the neighbor eNB/RN network element refers to information of all cells, or information of part of cells, or information of cells to be added, or information of cells to be deleted of the neighbor eNB/RN network element;

the GU Group Id List of the neighbor eNB/RN network element correspondingly refers to the whole GU Group Id List, or part of the GU Group Id List, or the GU Group Id List to be added, or the GU Group Id List to be deleted of the neighbor eNB/RN network element.

The embodiment of the present invention also puts forward a wireless relay system, comprising a DeNB, a neighbor eNB and an RN, wherein the DeNB is configured to send a GU Group Id List and cell information of a neighbor eNB/RN network element to the RN network element/neighbor eNB; and the RN network element/neighbor eNB is configured to establish a corresponding relationship between an eNB identifier of the neighbor eNB/RN network element and the GU Group Id List of the neighbor eNB/RN network element, according to the cell information and the GU Group Id List sent from the DeNB.

The DeNB is configured to send the GU Group Id List and the cell information of the neighbor eNB/RN network element to the RN network element/neighbor eNB in the following manner: the DeNB sending the GU Group Id List and the cell information of the neighbor eNB/RN network element to the RN network element/neighbor eNB through an eNB configuration update message, wherein the eNB configuration update message only carries relevant information of the neighbor eNB/RN network element; and the RN network element/neighbor eNB is configured to establish the corresponding relationship between the eNB identifier of the neighbor eNB/RN network element and the GU Group Id List of the neighbor eNB/RN network element in the following manner: the RN network element/neighbor eNB parsing the eNB configuration update message to obtain the GU Group Id List and the eNB identifier of the neighbor eNB/RN network element, and establishing the corresponding relationship between the GU Group Id List and the eNB identifier of the neighbor eNB/RN network element.

The DeNB is further configured to obtain X2 interface information of the neighbor eNB/RN network element, wherein the X2 interface information comprises the eNB identifier, the cell information and the GU Group Id List of the neighbor eNB/RN network element;

the cell information of the neighbor eNB/RN network element refers to information of all cells, or information of part of cells, or information of cells to be added, or information of cells to be deleted of the neighbor eNB/RN network element;

the GU Group Id List of the neighbor eNB/RN network element correspondingly refers to the whole GU Group Id List, or part of the GU Group Id List, or the GU Group Id List to be added, or the GU Group Id List to be deleted of the neighbor eNB/RN network element.

The implementation of the technical solution of the present invention will be further illustrated hereinafter in conjunction with the accompanying drawings.

Embodiment 1

In this embodiment, the DeNB sends the X2 interface information of the RN to the eNB. The X2 interface link between the DeNB and the eNB is not established, the X2 interface link between the RN and the DeNB network element has been established, and the setup of the X2 interface link between the DeNB and the eNB is initiated by the DeNB.

Figure 10:
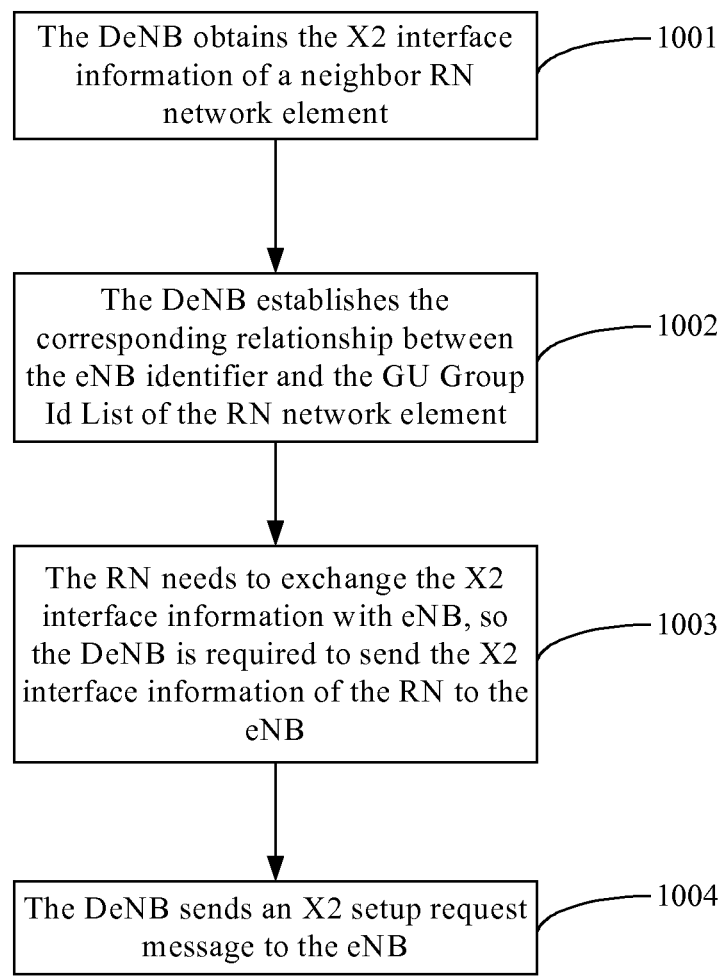
FIG. 10 is a flowchart of the method for obtaining interface information of a relay node in Embodiment 1 of the present invention.

FIG. 10 is a flowchart of the method for obtaining the interface information of the relay node in Embodiment 1 of the present invention. As shown in FIG. 10, the method comprises steps as follows.

Step 1001: the DeNB obtains the X2 interface information of the neighbor RN network element.

The X2 interface information of the neighbor RN network element comprises the eNB identifier (Global eNB ID), serving cell and GU Group Id List of the RN network element. Herein, the serving cell refers to cell information.

Figure 9:
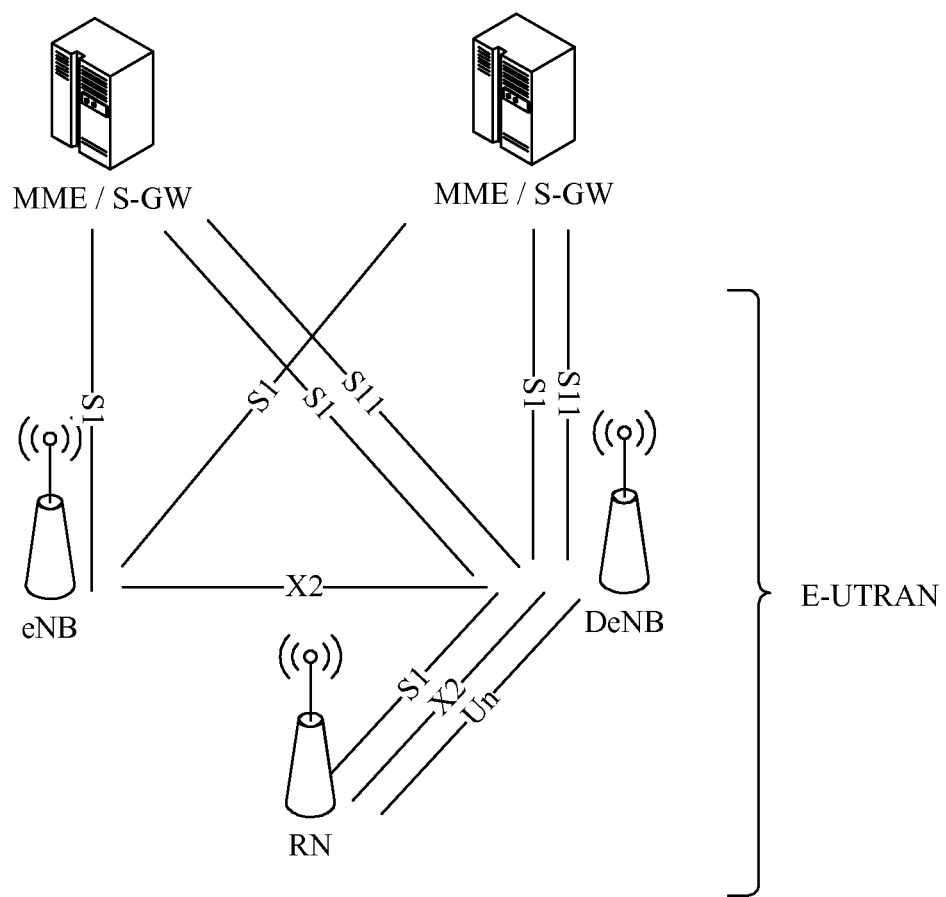
FIG. 9 is a schematic view of the typical network architecture after the introduction of an RN network element.

Referring to FIG. 9, for example, the eNB identifier (eNB id) and the GU Group Id List of the RN network element are eNB 1 and GU 1 respectively; the eNB identifier and the GU Group Id List of the eNB network element in the figure are eNB 2 and GU 2 respectively.

Step 1002: the DeNB establishes the corresponding relationship between the eNB identifier of the RN network element and the GU Group Id List of the RN network element. In this embodiment, the corresponding relationship is (eNB1-GU 1).

Step 1003: the RN needs to exchange X2 interface information with the eNB, and the DeNB is required to send the X2 interface information of the RN to the eNB.

Step 1004: no established X2 interface exists between the DeNB and the eNB and an X2 interface is allowed to be established between the DeNB and the eNB, then the DeNB sends an X2 setup request message to the eNB, wherein the X2 setup request message carries the corresponding relationship between the eNB identifier of the RN and the GU Group Id List of the RN.

In the X2 setup request message, the DeNB sends the serving cell information of the RN as its own serving cell information to the eNB. The corresponding relationship between the eNB identifier of the RN network element and the GU Group Id List of the RN network element is carried in the X2 setup request message. Specifically, the eNB information of the RN can be added to the information of the core network pool group (GU Group) that the RN belongs to in a GU Group Id field of the X2 setup request message, wherein the eNB information in this embodiment is eNB 1.

Certainly, the DeNB can also add the corresponding relationship (eNB1-GU 1) at other locations of the X2 setup request message.

An optimizable condition is: if the core network pool group (GU Group) that the RN belongs to is the same as that the DeNB belonging to, namely the information of the core network pool group (GU Group) of the DeNB is also GU1, then the DeNB and the eNB are not required to process the transmission of the information specially.

The situation where no X2 interface link between the RN and the DeNB network element is established, the DeNB is required to send the X2 interface information of the eNB to the RN, and the setup of the X2 interface link between the DeNB and the RN is initiated by the DeNB is similar to that in this embodiment, so details will not be given herein.

Embodiment 2

In this embodiment, the DeNB sends the X2 interface information of the RN to the eNB. The X2 interface link between the DeNB and the eNB is not established, the X2 interface link between the RN and the DeNB network element has been established, and the setup of the X2 interface link between the DeNB and the eNB is initiated by the eNB.

Figure 11:
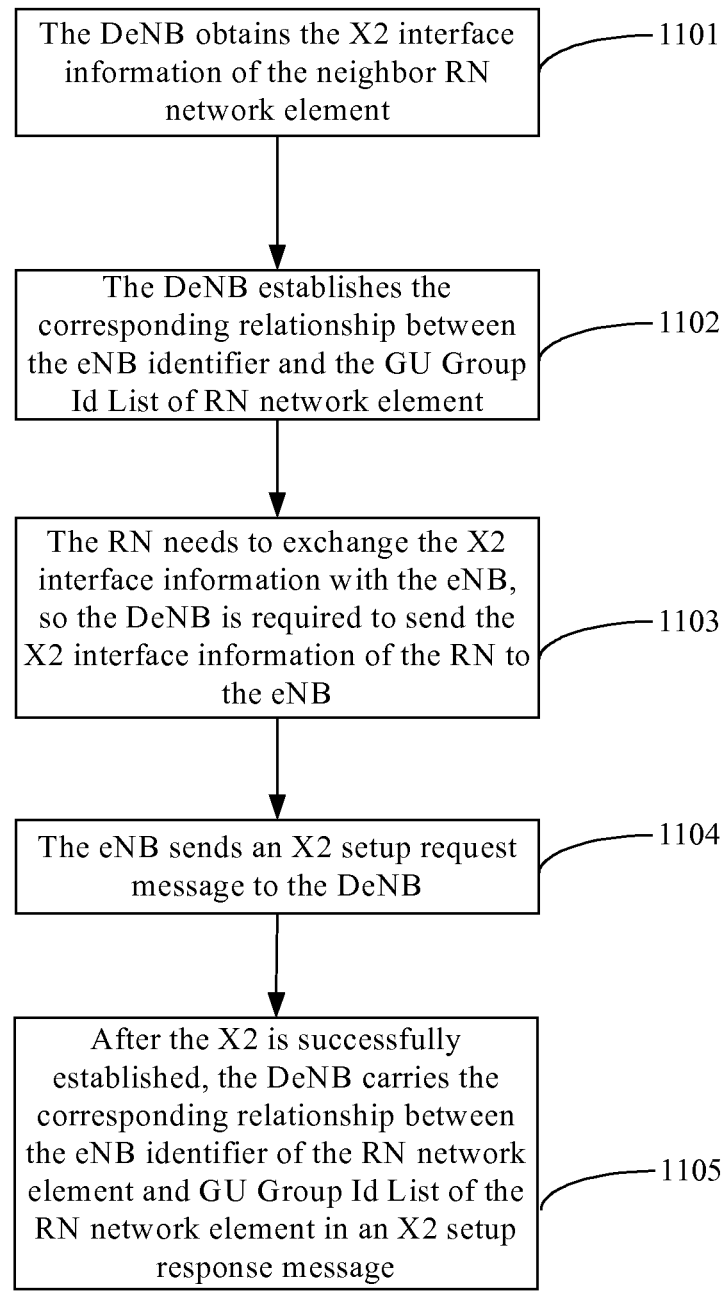
FIG. 11 is a flowchart of the method for obtaining interface information of a relay node in Embodiment 2 of the present invention.

FIG. 11 is a flowchart of the method for obtaining the interface information of the relay node in Embodiment 2 of the present invention. As shown in FIG. 11, the method comprises steps as follows.

Step 1101: the DeNB obtains the X2 interface information of the neighbor RN network element.

The X2 interface information of the neighbor RN network element comprises the eNB identifier (Global eNB ID), serving cell and GU Group Id List of the RN network element. Herein, the serving cell refers to cell information.

Referring to FIG. 9, for example, the eNB identifier (eNB id) and the GU Group Id List of the RN network element are eNB 1 and GU 1 respectively; the eNB identifier and the GU Group Id List of the eNB network element in the figure are eNB 2 and GU 2 respectively.

Step 1102: the DeNB establishes the corresponding relationship between the eNB identifier of the RN network element and the GU Group Id List of the RN network element. In this embodiment, the corresponding relationship is (eNB1-GU 1).

Step 1103: the RN needs to exchange X2 interface information with the eNB, and the DeNB is required to send the X2 interface information of the RN to the eNB.

Step 1104: no established X2 interface exists between the DeNB and the eNB and an X2 interface is allowed to be established between the DeNB and the eNB, then the eNB sends an X2 setup request message to the DeNB.

Step 1105: the X2 is successfully established, then the DeNB makes an X2 setup response message carry the corresponding relationship between the eNB identifier of the RN network element and GU Group Id List of the RN network element.

In the X2 setup response message, the DeNB sends the serving cell information of the RN as its own serving cell information to the eNB. The corresponding relationship between the eNB identifier of the RN network element and the GU Group Id List of the RN network element is carried in the X2 setup request message. Specifically, the eNB information of the RN can be added to the information of the core network pool group (GU Group) that the RN belongs to in a GU Group Id field of the message, wherein the eNB information in this embodiment is eNB 1.

Certainly, the DeNB can also add the corresponding relationship (eNB1-GU 1) at other locations of the message.

An optimizable condition is: if the core network pool group (GU Group) that the RN belongs to is the same as that the DeNB belonging to, namely the information of the core network pool group (GU Group) of the DeNB is also GU1, then the DeNB and the eNB are not required to process the message specially.

The situation where no X2 interface link between the RN and the DeNB network element is established, the DeNB is required to send the X2 interface information of the eNB to the RN, and the setup of the X2 interface link between the DeNB and the RN is initiated by the RN is similar to that in this embodiment, so details will not be given herein.

Embodiment 3

In this embodiment, the DeNB sends the X2 interface information of the RN to the eNB. The X2 interface between the DeNB and the eNB has been established, and the X2 interface link between the RN and the DeNB network element has been established.

Figure 12:
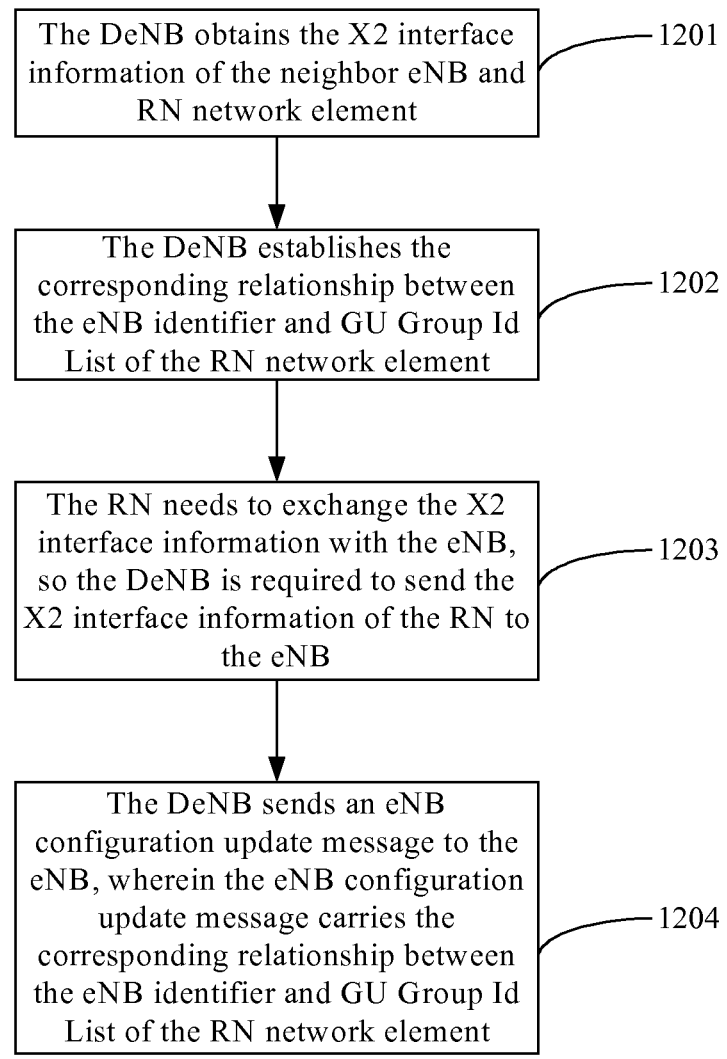
FIG. 12 is a flowchart of the method for obtaining interface information of a neighbor eNB in Embodiment 3 of the present invention.

FIG. 12 is a flowchart of the method for obtaining the interface information of the neighbor eNB in Embodiment 3 of the present invention. As shown in FIG. 12, the method comprises the steps as follows.

Step 1201: the DeNB obtains the X2 interface information of the neighbor eNB and the RN network element.

The X2 interface information of the neighbor RN network element comprises the eNB identifier (Global eNB ID), serving cell and GU Group Id List corresponding to the RN network element. Herein, the serving cell refers to cell information.

Referring to FIG. 9, for example, the eNB identifier (eNB id) and the GU Group Id List of the RN network element are eNB 1 and GU 1 respectively; the eNB identifier and the GU Group Id List of the eNB network element in the figure are eNB 2 and GU 2 respectively.

Step 1202: the DeNB establishes the corresponding relationship between the eNB identifier of the RN network element and the GU Group Id List of the RN network element. In this embodiment, the corresponding relationship is (eNB1-GU 1).

Step 1203: the RN needs to exchange X2 interface information with the eNB, and the DeNB is required to send the X2 interface information of the RN to the eNB.

Step 1204: in the situation where an X2 interface has been established between the DeNB and the eNB, the DeNB sends an eNB configuration update message to the eNB, wherein the eNB configuration update message carries the corresponding relationship between the eNB identifier of the RN network element and GU Group Id List of the RN network element.

Specifically, the eNB information of the RN can be added to the information of the core network pool group (GU Group) that the RN belongs to in the field GU Group Id To Add List or GU Group Id To Delete List of the eNB configuration update message, wherein the eNB information in this embodiment is eNB 1.

Certainly, the DeNB could add the corresponding relationship (eNB1-GU 1) at other locations of the eNB configuration update message.

An optimizable condition is: if the core network pool group (GU Group) that the RN belongs to is the same as that the DeNB belonging to, namely the information of the core network pool group (GU Group) of the DeNB is also GU1, then the DeNB and the eNB are not required to process the transmission of the information specially.

The situation where the X2 interface link between the RN and the DeNB network element has been established and the DeNB is required to send the X2 interface information of the eNB to the RN is similar to this embodiment, so no details will be given.

Embodiment 4

In this embodiment, the X2 interface link between the RN and the DeNB network element has been established, a new X2 link is established between the eNB and the DeNB, and the DeNB needs to send the X2 interface information of the eNB to the RN.

Figure 13:
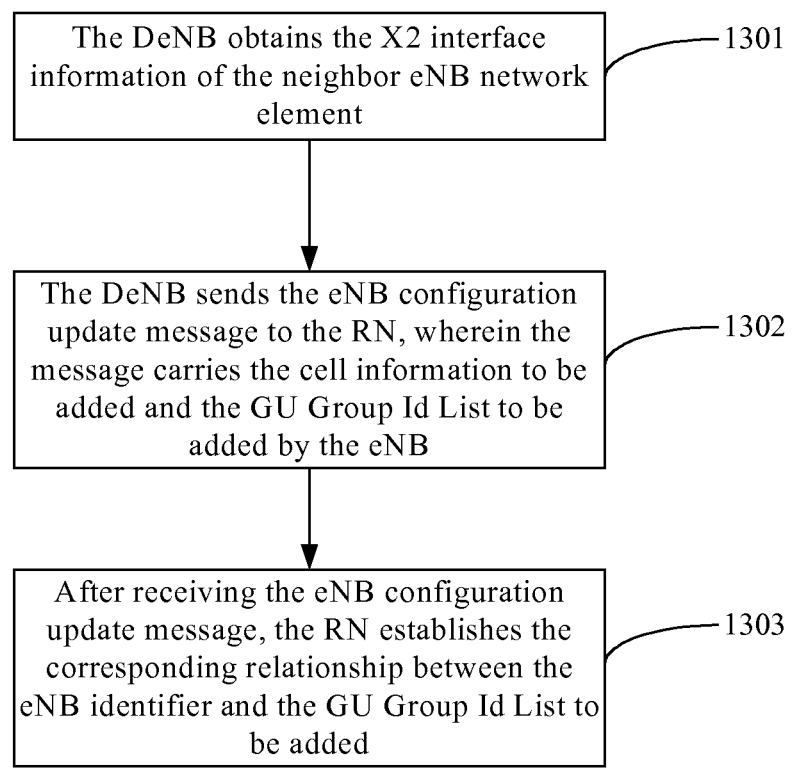
FIG. 13 is a flowchart of the method for obtaining interface information of a neighbor eNB in Embodiment 4 of the present invention.

FIG. 13 is a flowchart of the method for obtaining the interface information of the neighbor eNB in Embodiment 4 of the present invention. As shown in FIG. 13, the method comprises the steps as follows.

Step 1301: the DeNB obtains the X2 interface information of the neighbor eNB network element.

Herein, the X2 interface information comprises the eNB identifier (Global eNB ID), the serving cell and the GU Group Id List of the eNB network element. In this embodiment, the neighbor eNB of the DeNB needs to add the cell information and the GU Group Id List to the neighbor, wherein the serving cell is the cell information that is to be added by the eNB, and the GU Group Id List is the GU Group Id List to be added. The cell information carries the Enhanced whole Cell Global Identification (ECGI) of the eNB network element based on which the eNB identifier of the network element can be obtained.

Referring to FIG. 9, for example, the eNB identifier (eNB id) and the GU Group Id List of the RN network element are eNB 1 and GU 1 respectively; the eNB identifier and the GU Group Id List of the eNB network element in the figure are eNB 2 and GU 2 respectively.

Step 1302: the DeNB sends an eNB configuration update message to the RN, wherein the message carries the cell information to be added and the GU Group Id List to be added by the eNB.

Herein, the DeNB can write the cell information to be added into the field of Served cells To Add of the eNB configuration update message; and can write the GU Group Id List to be added, which is GU 2 in this embodiment, into the field of GU Group Id To Add List of the eNB configuration update message.

What requires explanation is: when the DeNB sends the eNB configuration update message, this message shall only carry the relevant information of the eNB, so the DeNB must guarantee that the information about the DeNB itself or other network elements can not be carried at the same time.

Step 1303: after receiving the eNB configuration update message, the RN obtains the eNB identifier according to the ECGI in the field of Served cells To Add, obtains the GU Group Id List to be added from the field of GU Group Id To Add List, and establishes the corresponding relationship between the eNB identifier and the GU Group Id List to be added at last.

Herein, the ID of the eNB is different from that of the DeNB, from which it can be judged that what is transmitted is the X2 interface configuration information of the neighbor eNB of the DeNB.

In this embodiment, the eNB identifier obtained according to the ECGI is eNB 2, the value of the GU Group Id List to be added which is obtained from the field of GU Group Id To Add List is GU2, and the corresponding relationship established is (eNB 2-GU2).

What requires explanation is: the situation where the X2 interface link between the eNB and the DeNB network element has been established, a new X2 link is established between the RN and the DeNB, and the DeNB is required to send the X2 interface information of the RN to the eNB is similar to that in this embodiment, so no details will be given.

Embodiment 5

In this embodiment, an X2 link has already been established between the eNB and the DeNB. The eNB deletes part of its GU Group Id information, and the eNB needs to send this deleted information to the RN.

Figure 14:
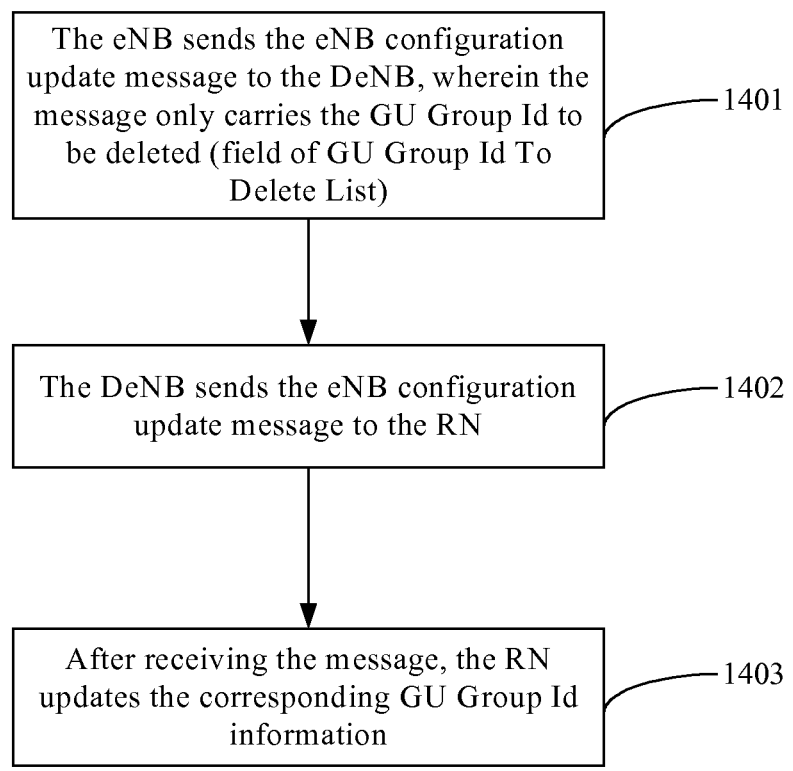
FIG. 14 is a flowchart of the method for obtaining interface information of a neighbor eNB in Embodiment 5 of the present invention.

FIG. 14 is a flowchart of the method for obtaining the interface information of the neighbor eNB in Embodiment 5 of the present invention. As shown FIG. 14, the method comprises the steps as follows.

Step 1401: the eNB sends an eNB configuration update message to the DeNB, wherein the message only carries the GU Group Id to be deleted (field of GU Group Id To Delete List).

Step 1402: the DeNB sends the eNB configuration update message to the RN.

Herein, the DeNB can write a certain serving cell of the eNB which is saved before into the field of Served cells To Add List or Served cells To Modify List in the eNB configuration update message; at the same time, the DeNB writes the GU Group Id List to be deleted by the eNB into the field of GU Group Id To delete List.

What requires explanation is: when the DeNB sends the message, this message shall only carry the relevant information of the eNB, so the DeNB must guarantee that the information about the DeNB itself or other network elements can not be carried at the same time.

Step 1403: After receiving the message, the RN updates the corresponding GU Group Id information.

By checking the ECGI in the field of Served cells To Add List or Served cells To Modify List in the message sent from the DeNB, the RN can learn from the ECGI that the ID of the eNB is different from that of the DeNB, from which it can be judged that what is transmitted is the X2 configuration information of the neighbor eNB of the DeNB. The RN could find the saved relevant information about this eNB according to the ID of the eNB.

At the same time, the RN will check the message sent from the DeNB to learn the GU Group Id information to be deleted by the eNB with this eNB id, and the RN could perform related operation according to the eNB id and the GU Group Id.

What requires explanation is: the situation where the X2 link between the RN and the DeNB has been established, the RN deletes part of the GU Group Id information thereof, and the RN needs to send this deleted information to the eNB is similar to this embodiment, so no details will be given.

Embodiment 6

In this embodiment, the X2 interface between the DeNB and the eNB has been established, and the DeNB has not established an X2 interface with the RN. During the establishment of the X2 link between the RN and DeNB, the X2 interface information of the eNB needs to be sent to the RN at this time.

The X2 setup process of the RN and the DeNB is initiated by the RN or the DeNB, during the process, only the relevant information of the DeNB itself or other eNBs is carried, so the DeNB must guarantee that no information about the eNB can be sent at the same time in this process.

After the success of the setup of the X2 interface between the RN and the DeNB, the DeNB sends the X2 interface information of the eNB to the RN using the processes in Embodiments 5 and 6.

It can be seen that through the method for obtaining interface information of a neighbor eNB/RN and a wireless relay system provided by the embodiments of the present invention, a DeNB can establish a corresponding relationship between an eNB identifier of the neighbor eNB/RN network element and the GU Group Id List of the neighbor eNB/RN network element according to X2 interface information, and send the corresponding relationship to the RN network element/neighbor eNB; the DeNB can also send a GU Group Id List and cell information of the neighbor eNB/RN network element to the RN network element/ neighbor eNB which can establish the corresponding relationship between the GU Group Id List and the eNB identifier of the neighbor eNB/RN network element. The problem that the RN or the eNB network element in a wireless relay system can not obtain the corresponding relationship between the eNB id and the GU Group Id List thereof, caused by the existence of an intermediate network element DeNB, is solved by the embodiments of the present invention.

The description above is just the preferable embodiments of the present invention, not intended to limit the protection scope of the present invention.

What is claimed is:

1. A method for obtaining interface information of a neighbor evolved NodeB (eNB) or a neighbor Relay Node (RN), comprising:
    a Donor-eNB (DeNB) receiving an eNB identifier of a neighbor eNB or a neighbor RN network element through one of the following manners: active obtaining, passive receiving or network management configuration;
    the Donor-eNB (DeNB) establishing a corresponding relationship between the eNB identifier of the neighbor eNB and a core network pool globally unique group identifier list (GU Group Id List) of the neighbor eNB, and sending the corresponding relationship to a neighbor RN network element; or the DeNB sending the GU Group Id List and cell information of the neighbor eNB to the neighbor RN network element, and the neighbor RN network element establishing the corresponding relationship between the eNB identifier of the neighbor eNB and the GU Group Id List of the neighbor eNB; or
    the DeNB establishing a corresponding relationship between the eNB identifier of the neighbor RN network element and a GU Group Id List of the neighbor RN network element, and sending the corresponding relationship to the neighbor eNB; or the DeNB sending the GU Group Id List and cell information of the neighbor RN network element to the neighbor eNB, and the neighbor eNB establishing the corresponding relationship between the eNB identifier of the neighbor RN network element and the GU Group Id List of the neighbor RN network element;
    wherein the GU Group Id List indicates a pool of the core network that the eNB belongs to, and is adopted for the neighbor eNB or the neighbor RN network element to judge whether a handover is performed through a S1 interface or a X2 interface.

2. The method as claimed in claim 1, wherein
    when an X2 interface link between the DeNB and the neighbor RN network element is not established, the step of the DeNB sending the corresponding relationship between the eNB identifier of the neighbor eNB and the GU Group Id List of the neighbor eNB to the neighbor RN network element comprises: the DeNB sending an X2 setup request message or an X2 setup response message, which carries the corresponding relationship between the eNB identifier of the neighbor eNB and the GU Group Id List of the neighbor eNB, to the neighbor RN network element;

or when an X2 interface link between the DeNB and the neighbor eNB is not established, the step of the DeNB sending the corresponding relationship between the eNB identifier of the neighbor RN network element and the GU Group Id List of the neighbor RN network element to the neighbor eNB comprises: the DeNB sending an X2 setup request message or an X2 setup response message, which carries the corresponding relationship between the eNB identifier of the neighbor RN network element and the GU Group Id List of the neighbor RN network element, to the neighbor eNB.

3. The method as claimed in claim 2, wherein before the step of the DeNB establishing the corresponding relationship between the eNB identifier of the neighbor eNB and the GU Group Id List of the neighbor eNB, or before the step of the DeNB sending the GU Group Id List and the cell information of the neighbor eNB to the neighbor RN network element, the method further comprises: the DeNB obtaining X2 interface information of the neighbor eNB, wherein the X2 interface information comprises the eNB identifier, the cell information and the GU Group Id List of the neighbor eNB, the cell information of the neighbor eNB refers to information of all cells, or information of part of cells, or information of cells to be added, or information of cells to be deleted of the neighbor eNB; the GU Group Id List of the neighbor eNB correspondingly refers to a whole GU Group Id List, or part of the GU Group Id List, or the GU Group Id List to be added, or the GU Group Id List to be deleted of the neighbor eNB;

or before the step of the DeNB establishing the corresponding relationship between the eNB identifier of the neighbor RN network element and the GU Group Id List of the neighbor RN network element, or before the step of the DeNB sending the GU Group Id List and the cell information of the neighbor RN network element to the neighbor eNB, the method further comprises: the DeNB obtaining X2 interface information of the neighbor RN network element, wherein the X2 interface information comprises the eNB identifier, the cell information and the GU Group Id List of the neighbor RN network element, the cell information of the neighbor RN network element refers to information of all cells, or information of part of cells, or information of cells to be added, or information of cells to be deleted of the neighbor RN network element; the GU Group Id List of the neighbor RN network element correspondingly refers to a whole GU Group Id List, or part of the GU Group Id List, or the GU Group Id List to be added, or the GU Group Id List to be deleted of the neighbor RN network element.

4. The method as claimed in claim 3, wherein the step of the DeNB obtaining the X2 interface information of the neighbor eNB comprises: the DeNB obtaining the X2 interface information of the neighbor eNB in a manner of active obtaining, passive receiving or network management configuration;

or the step of the DeNB obtaining the X2 interface information of the neighbor RN network element comprises: the DeNB obtaining the X2 interface information of the neighbor RN network element in a manner of active obtaining, passive receiving or network management configuration.

5. The method as claimed in claim 1, wherein when an X2 interface link between the DeNB and the neighbor RN network element has been established, the step of the DeNB sending the corresponding relationship between the eNB identifier of the neighbor eNB and the GU Group Id List of the neighbor eNB to the neighbor RN network element comprises: the DeNB sending an eNB configuration update message, which carries the corresponding relationship between the eNB identifier of the neighbor eNB and the GU Group Id List of the neighbor eNB, to the neighbor RN network element;

or when an X2 interface link between the DeNB and the neighbor eNB has been established, the step of the DeNB sending the corresponding relationship between the eNB identifier of the neighbor RN network element and the GU Group Id List of the neighbor RN network element to the neighbor eNB comprises: the DeNB sending an eNB configuration update message, which carries the corresponding relationship between the eNB identifier of the neighbor RN network element and the GU Group Id List of the neighbor RN network element, to the neighbor eNB.

6. The method as claimed in claim 5, wherein before the step of the DeNB establishing the corresponding relationship between the eNB identifier of the neighbor eNB and the GU Group Id List of the neighbor eNB, or before the step of the DeNB sending the GU Group Id List and the cell information of the neighbor eNB to the neighbor RN network element, the method further comprises: the DeNB obtaining X2 interface information of the neighbor eNB, wherein the X2 interface information comprises the eNB identifier, the cell information and the GU Group Id List of the neighbor eNB, the cell information of the neighbor eNB refers to information of all cells, or information of part of cells, or information of cells to be added, or information of cells to be deleted of the neighbor eNB; the GU Group Id List of the neighbor eNB correspondingly refers to a whole GU Group Id List, or part of the GU Group Id List, or the GU Group Id List to be added, or the GU Group Id List to be deleted of the neighbor eNB;

or before the step of the DeNB establishing the corresponding relationship between the eNB identifier of the neighbor RN network element and the GU Group Id List of the neighbor RN network element, or before the step of the DeNB sending the GU Group Id List and the cell information of the neighbor RN network element to the neighbor eNB, the method further comprises: the DeNB obtaining X2 interface information of the neighbor RN network element, wherein the X2 interface information comprises the eNB identifier, the cell information and the GU Group Id List of the neighbor RN network element, the cell information of the neighbor RN network element refers to information of all cells, or information of part of cells, or information of cells to be added, or information of cells to be deleted of the neighbor RN network element; the GU Group Id List of the neighbor RN network element correspondingly refers to a whole GU Group Id List, or part of the GU Group Id List, or the GU Group Id List to be added, or the GU Group Id List to be deleted of the neighbor RN network element.

7. The method as claimed in claim 6, wherein
the step of the DeNB obtaining the X2 interface information of the neighbor eNB comprises: the DeNB obtaining the X2 interface information of the neighbor eNB in a manner of active obtaining, passive receiving or network management configuration;
or
the step of the DeNB obtaining the X2 interface information of the neighbor RN network element comprises: the DeNB obtaining the X2 interface information of the neighbor RN network element in a manner of active obtaining, passive receiving or network management configuration.

8. The method as claimed in claim 1, wherein
the steps of the DeNB sending the GU Group Id List and the cell information of the neighbor eNB to the neighbor RN network element, and the neighbor RN network element establishing the corresponding relationship between the eNB identifier of the neighbor eNB and the GU Group Id List of the neighbor eNB comprise: the DeNB sending the GU Group Id List and the cell information of the neighbor eNB to the neighbor RN network element through an eNB configuration update message, wherein the eNB configuration update message only carries relevant information of the neighbor eNB; and the neighbor RN network element parsing the eNB configuration update message to obtain the GU Group Id List and the eNB identifier of the neighbor eNB, and establishing the corresponding relationship between the GU Group Id List and the eNB identifier of the neighbor eNB;
or
the steps of the DeNB sending the GU Group Id List and the cell information of the neighbor RN network element to the neighbor eNB, and the neighbor eNB establishing the corresponding relationship between the eNB identifier of the neighbor RN network element and the GU Group Id List of the neighbor RN network element comprise: the DeNB sending the GU Group Id List and the cell information of the neighbor RN network element to the neighbor eNB through an eNB configuration update message, wherein the eNB configuration update message only carries relevant information of the neighbor RN network element; and the neighbor eNB parsing the eNB configuration update message to obtain the GU Group Id List and the eNB identifier of the neighbor RN network element, and establishing the corresponding relationship between the GU Group Id List and the eNB identifier of the neighbor RN network element.

9. The method as claimed in claim 8, wherein
before the step of the DeNB establishing the corresponding relationship between the eNB identifier of the neighbor eNB and the GU Group Id List of the neighbor eNB, or before the step of the DeNB sending the GU Group Id List and the cell information of the neighbor eNB to the neighbor RN network element, the method further comprises: the DeNB obtaining X2 interface information of the neighbor eNB, wherein the X2 interface information comprises the eNB identifier, the cell information and the GU Group Id List of the neighbor eNB, the cell information of the neighbor eNB refers to information of all cells, or information of part of cells, or information of cells to be added, or information of cells to be deleted of the neighbor eNB; the GU Group Id List of the neighbor eNB correspondingly refers to a whole GU Group Id List, or part of the GU Group Id List, or the GU Group Id List to be added, or the GU Group Id List to be deleted of the neighbor eNB;
or
before the step of the DeNB establishing the corresponding relationship between the eNB identifier of the neighbor RN network element and the GU Group Id List of the neighbor RN network element, or before the step of the DeNB sending the GU Group Id List and the cell information of the neighbor RN network element to the neighbor eNB, the method further comprises: the DeNB obtaining X2 interface information of the neighbor RN network element, wherein the X2 interface information comprises the eNB identifier, the cell information and the GU Group Id List of the neighbor RN network element, the cell information of the neighbor RN network element refers to information of all cells, or information of part of cells, or information of cells to be added, or information of cells to be deleted of the neighbor RN network element; the GU Group Id List of the neighbor RN network element correspondingly refers to a whole GU Group Id List, or part of the GU Group Id List, or the GU Group Id List to be added, or the GU Group Id List to be deleted of the neighbor RN network element.

10. The method as claimed in claim 9, wherein
the step of the DeNB obtaining the X2 interface information of the neighbor eNB comprises: the DeNB obtaining the X2 interface information of the neighbor eNB in a manner of active obtaining, passive receiving or network management configuration;
or
the step of the DeNB obtaining the X2 interface information of the neighbor RN network element comprises: the DeNB obtaining the X2 interface information of the neighbor RN network element in a manner of active obtaining, passive receiving or network management configuration.

11. The method as claimed in claim 1, wherein
before the step of the DeNB establishing the corresponding relationship between the eNB identifier of the neighbor eNB and the GU Group Id List of the neighbor eNB, or before the step of the DeNB sending the GU Group Id List and the cell information of the neighbor eNB to the neighbor RN network element, the method further comprises: the DeNB obtaining X2 interface information of the neighbor eNB, wherein the X2 interface information comprises the eNB identifier, the cell information and the GU Group Id List of the neighbor eNB, the cell information of the neighbor eNB refers to information of all cells, or information of part of cells, or information of cells to be added, or information of cells to be deleted of the neighbor eNB; the GU Group Id List of the neighbor eNB correspondingly refers to a whole GU Group Id List, or part of the GU Group Id List, or the GU Group Id List to be added, or the GU Group Id List to be deleted of the neighbor eNB;
or
before the step of the DeNB establishing the corresponding relationship between the eNB identifier of the neighbor RN network element and the GU Group Id List of the neighbor RN network element, or before the step of the DeNB sending the GU Group Id List and the cell information of the neighbor RN network element to the neighbor eNB, the method further comprises: the DeNB obtaining X2 interface information of the neighbor RN network element, wherein the X2 interface information comprises the eNB identifier, the cell information and the GU Group Id List of the neighbor RN network element, the cell information of the neighbor RN network element refers to information of all cells, or information of part of cells, or information of cells to be added, or information of cells to be deleted of the neighbor RN network element; the GU Group Id List of the neighbor RN network element correspondingly refers to a whole GU Group Id List, or part of the GU Group Id List, or the GU Group Id List to be added, or the GU Group Id List to be deleted of the neighbor RN network element.

12. The method as claimed in claim 11, wherein
the step of the DeNB obtaining the X2 interface information of the neighbor eNB comprises: the DeNB obtaining the X2 interface information of the neighbor eNB in a manner of active obtaining, passive receiving or network management configuration;

or the step of the DeNB obtaining the X2 interface information of the neighbor RN network element comprises: the DeNB obtaining the X2 interface information of the neighbor RN network element in a manner of active obtaining, passive receiving or network management configuration.

13. A wireless relay system, comprising: a Donor-eNB (DeNB), a neighbor evolved NodeB (eNB) and a neighbor Relay Node (RN), wherein
the DeNB receives an eNB identifier of the neighbor eNB or the neighbor RN network element through one of the following manners: active obtaining, passive receiving or network management configuration;
the DeNB is configured to establish a corresponding relationship between the eNB identifier of the neighbor eNB and a core network pool globally unique group identifier list (GU Group Id List) of the neighbor eNB, and send the corresponding relationship to a neighbor RN network element; or establish a corresponding relationship between the eNB identifier of the neighbor RN network element and a GU Group Id List of the neighbor RN network element, and send the corresponding relationship to the neighbor eNB;
wherein the GU Group Id List indicates a pool of the core network that the eNB belongs to, and is adopted for the neighbor eNB or the neighbor RN network element to judge whether a handover is performed through a S1 interface or a X2 interface.

14. The system as claimed in claim 13, wherein
the DeNB is configured to send the corresponding relationship to the neighbor RN network element in the following manners: when an X2 interface link between the DeNB and the neighbor RN network element is not established, an X2 setup request message or an X2 setup response message sent to the neighbor RN network element carries the corresponding relationship between the eNB identifier of the neighbor eNB and the GU Group Id List of the neighbor eNB; when an X2 interface link between the DeNB and the neighbor RN network element has been established, an eNB configuration update message sent to the neighbor RN network element carries the corresponding relationship between the eNB identifier of the neighbor eNB and the GU Group Id List of the neighbor eNB;

or the DeNB is configured to send the corresponding relationship to the neighbor eNB in the following manners: when an X2 interface link between the DeNB and the neighbor eNB is not established, an X2 setup request message or an X2 setup response message sent to the neighbor eNB carries the corresponding relationship between the eNB identifier of the neighbor RN network element and the GU Group Id List of the neighbor RN network element; when an X2 interface link between the DeNB and the neighbor eNB has been established, an eNB configuration update message sent to the neighbor eNB carries the corresponding relationship between the eNB identifier of the neighbor RN network element and the GU Group Id List of the neighbor RN network element.

15. The system as claimed in claim 14, wherein
the DeNB is further configured to obtain X2 interface information of the neighbor eNB, wherein the X2 interface information comprises the eNB identifier, cell information and the GU Group Id List of the neighbor eNB; the cell information of the neighbor eNB refers to information of all cells, or information of part of cells, or information of cells to be added, or information of cells to be deleted of the neighbor eNB; the GU Group Id List of the neighbor eNB correspondingly refers to a whole GU Group Id List, or part of the GU Group Id List, or the GU Group Id List to be added, or the GU Group Id List to be deleted of the neighbor eNB;

or the DeNB is further configured to obtain X2 interface information of the neighbor RN network element, wherein the X2 interface information comprises the eNB identifier, cell information and the GU Group Id List of the neighbor RN network element; the cell information of the neighbor RN network element refers to information of all cells, or information of part of cells, or information of cells to be added, or information of cells to be deleted of the neighbor RN network element; the GU Group Id List of the neighbor RN network element correspondingly refers to a whole GU Group Id List, or part of the GU Group Id List, or the GU Group Id List to be added, or the GU Group Id List to be deleted of the neighbor RN network element.

16. The system as claimed in claim 13, wherein
the DeNB is further configured to obtain X2 interface information of the neighbor eNB, wherein the X2 interface information comprises the eNB identifier, cell information and the GU Group Id List of the neighbor eNB; the cell information of the neighbor eNB refers to information of all cells, or information of part of cells, or information of cells to be added, or information of cells to be deleted of the neighbor eNB; the GU Group Id List of the neighbor eNB correspondingly refers to a whole GU Group Id List, or part of the GU Group Id List, or the GU Group Id List to be added, or the GU Group Id List to be deleted of the neighbor eNB;

or the DeNB is further configured to obtain X2 interface information of the neighbor RN network element, wherein the X2 interface information comprises the eNB identifier, cell information and the GU Group Id List of the neighbor RN network element; the cell information of the neighbor RN network element refers to information of all cells, or information of part of cells, or information of cells to be added, or information of cells to be deleted of the neighbor RN network element; the GU Group Id List of the neighbor RN network element correspondingly refers to a whole GU Group Id List, or part of the GU Group Id List, or the GU Group Id List to be added, or the GU Group Id List to be deleted of the neighbor RN network element.

17. A wireless relay system, comprising: a Donor-eNB (DeNB), a neighbor evolved NodeB (eNB) and a neighbor Relay Node (RN), wherein the DeNB receives cell information of the neighbor eNB or the neighbor RN network element through one of the following manners: active obtaining, passive receiving or network management configuration;

the DeNB is configured to send a core network pool globally unique group identifier list (GU Group Id List) and cell information of the neighbor eNB to a neighbor RN network element; and the neighbor RN network element is configured to establish a corresponding relationship between an eNB identifier of the neighbor eNB and the GU Group Id List of the neighbor eNB, according to the cell information and the GU Group Id List sent from the DeNB;

or the DeNB is configured to send a GU Group Id List and cell information of the neighbor RN network element to the neighbor eNB; and the neighbor eNB is configured to establish a corresponding relationship between an eNB identifier of the neighbor RN network element and the GU Group Id List of the neighbor RN network element, according to the cell information and the GU Group Id List sent from the DeNB;

wherein the GU Group Id List indicates a pool of the core network that the eNB belongs to, and is adopted for the neighbor eNB or the neighbor RN network element to judge whether a handover is performed through a S1 interface or a X2 interface.

18. The system as claimed in claim 17, wherein the DeNB is configured to send the GU Group Id List and the cell information of the neighbor eNB to the neighbor RN network element in the following manner: the DeNB sending the GU Group Id List and the cell information of the neighbor eNB to the neighbor RN network element through an eNB configuration update message, wherein the eNB configuration update message only carries relevant information of the neighbor eNB; and the neighbor RN network element is configured to establish the corresponding relationship between the eNB identifier of the neighbor eNB and the GU Group Id List of the neighbor eNB in the following manner: the neighbor RN network element parsing the eNB configuration update message to obtain the GU Group Id List and the eNB identifier of the neighbor eNB, and establishing the corresponding relationship between the GU Group Id List and the eNB identifier of the neighbor eNB;

or the DeNB is configured to send the GU Group Id List and the cell information of the neighbor RN network element to the neighbor eNB in the following manner: the DeNB sending the GU Group Id List and the cell information of the neighbor RN network element to the neighbor eNB through an eNB configuration update message, wherein the eNB configuration update message only carries relevant information of the neighbor RN network element; and the neighbor eNB is configured to establish the corresponding relationship between the eNB identifier of the neighbor RN network element and the GU Group Id List of the neighbor RN network element in the following manner: the neighbor eNB parsing the eNB configuration update message to obtain the GU Group Id List and the eNB identifier of the neighbor RN network element, and establishing the corresponding relationship between the GU Group Id List and the eNB identifier of the neighbor RN network element.

19. The system as claimed in claim 18, wherein the DeNB is further configured to obtain X2 interface information of the neighbor eNB, wherein the X2 interface information comprises the eNB identifier, the cell information and the GU Group Id List of the neighbor eNB; the cell information of the neighbor eNB refers to information of all cells, or information of part of cells, or information of cells to be added, or information of cells to be deleted of the neighbor eNB; the GU Group Id List of the neighbor eNB correspondingly refers to a whole GU Group Id List, or part of the GU Group Id List, or the GU Group Id List to be added, or the GU Group Id List to be deleted of the neighbor eNB;

or the DeNB is further configured to obtain X2 interface information of the neighbor RN network element, wherein the X2 interface information comprises the eNB identifier, the cell information and the GU Group Id List of the neighbor RN network element; the cell information of the neighbor RN network element refers to information of all cells, or information of part of cells, or information of cells to be added, or information of cells to be deleted of the neighbor RN network element; the GU Group Id List of the neighbor RN network element correspondingly refers to a whole GU Group Id List, or part of the GU Group Id List, or the GU Group Id List to be added, or the GU Group Id List to be deleted of the neighbor RN network element.

20. The system as claimed in claim 17, wherein the DeNB is further configured to obtain X2 interface information of the neighbor eNB, wherein the X2 interface information comprises the eNB identifier, the cell information and the GU Group Id List of the neighbor eNB; the cell information of the neighbor eNB refers to information of all cells, or information of part of cells, or information of cells to be added, or information of cells to be deleted of the neighbor eNB; the GU Group Id List of the neighbor eNB correspondingly refers to a whole GU Group Id List, or part of the GU Group Id List, or the GU Group Id List to be added, or the GU Group Id List to be deleted of the neighbor eNB;

or the DeNB is further configured to obtain X2 interface information of the neighbor RN network element, wherein the X2 interface information comprises the eNB identifier, the cell information and the GU Group Id List of the neighbor RN network element; the cell information of the neighbor RN network element refers to information of all cells, or information of part of cells, or information of cells to be added, or information of cells to be deleted of the neighbor RN network element; the GU Group Id List of the neighbor RN network element correspondingly refers to a whole GU Group Id List, or part of the GU Group Id List, or the GU Group Id List to be added, or the GU Group Id List to be deleted of the neighbor RN network element.

* * * * *